US012388372B2

(12) United States Patent
Vogel et al.

(10) Patent No.: US 12,388,372 B2
(45) Date of Patent: Aug. 12, 2025

(54) HYBRID, HIGH-POWER, BIDIRECTIONAL DC-DC CONVERTER

(71) Applicant: Combined Energies, LLC, Latham, NY (US)

(72) Inventors: John Anthony Vogel, Latham, NY (US); Mark Robert Wyman, East Bloomfield, NY (US)

(73) Assignee: Combined Energies LLC, Latham, NY (US)

( * ) Notice: Subject to any disclaimer, the term of this patent is extended or adjusted under 35 U.S.C. 154(b) by 229 days.

(21) Appl. No.: 18/345,317

(22) Filed: Jun. 30, 2023

(65) Prior Publication Data

US 2025/0007415 A1 Jan. 2, 2025

(51) Int. Cl.
*H02M 3/335* (2006.01)
*H02M 1/00* (2006.01)

(52) U.S. Cl.
CPC ..... *H02M 3/33584* (2013.01); *H02M 1/0043* (2021.05)

(58) Field of Classification Search
CPC ............. H02M 1/0043; H02M 1/0083; H02M 1/0096; H02M 7/08; H02M 7/153; H02M 7/17; H02M 7/23; H02M 7/77; H02M 7/81; H02M 7/66; H02M 7/68; H02M 7/757; H02M 3/335; H02M 3/33584
See application file for complete search history.

(56) References Cited

U.S. PATENT DOCUMENTS

2022/0166332 A1* 5/2022 Shim ....................... B60L 53/20

FOREIGN PATENT DOCUMENTS

WO WO-2021022297 A1 * 2/2021 .......... H02M 1/0077

* cited by examiner

*Primary Examiner* — Gary L Laxton
(74) *Attorney, Agent, or Firm* — Downs Rachlin Martin PLLC

(57) ABSTRACT

A hybrid, high-power, bidirectional DC to DC converter includes switches between a delta-wye configuration and a straight interleaved configuration. In this way, the converter can operate in a delta-wye configuration for low to mid-current input applications and in a straight interleaved configuration for high-current applications. This allows the converter to have high efficiency while maintaining a small size for a wide range of applications.

9 Claims, 4 Drawing Sheets

HYBRID, HIGH-POWER, BIDIRECTIONAL DC-DC CONVERTER

FIELD OF THE INVENTION

The present invention generally relates to the field of power electronics. In particular, the present invention is directed to a hybrid, high-power, bidirectional DC to DC converter.

BACKGROUND

A bidirectional DC to DC converter allows electrical power to flow in both directions in a circuit, which may be useful for situations in which, for example, a battery will serve as a source of power at certain times and as a receiver of power to store at other times. For example, a battery may be charged by a wind turbine while the wind is blowing and/or by a solar panel array when the sun is shining, and then provide power to a load when the wind is not blowing (for wind turbines) or when the sun is not shining (for solar arrays).

A DC to DC converter includes transformers with windings that determine the boost ratio or reduction ratio of voltages across the converter. In boosting low voltage DC-power input to high voltage power output (or bucking from higher to lower voltage), it may be advantageous from thermal management, packaging, controls, and conversion efficiency aspects to break the input into multiple phases and independently manage the inversion, transformer boost, and rectifying stages, and then recombine the power at the output. Connecting each phase's transformers in a delta-wye configuration (as in the circuit diagram shown in FIG. 2 (prior art)) realizes a doubling of the boost ratios of the transformers, minimizing transformer size and losses while providing flexibility in controlling low power states and variable input voltages.

A drawback with this configuration is the generation of circulation currents between the connected transformers. In low current input applications, this circulation current is negligible and has a small impact on efficiency. As input current increases, this effect requires careful control in order to avoid having to oversize the transformers and having to add inductors to prevent the circulation currents from causing damage during transients. In high input current applications, the resulting circulation currents become difficult to manage without substantial oversizing and inductance devices, significantly impacting conversion efficiency and the ability to handle transients.

A converter with a straight, interleaved topology (as in the circuit diagram shown in FIG. 1 (prior art)) circulating currents are not an issue but no boosting is available. In many circumstances, the benefits of a delta-wye configuration that would be possible at lower current inputs are not realized, even when they would be feasible for a significant portion of the operational profile.

SUMMARY OF THE DISCLOSURE

A hybrid, high-power bidirectional DC to DC converter includes a plurality of transformers, each of the plurality of transformers having a secondary winding; a plurality of rectifiers, wherein each of the plurality of rectifiers is associated with a respective one of the plurality of transformers; a plurality of first lines, each the plurality of first lines connecting a positive output of the secondary winding of one of the plurality of transformers to a positive input of a respective one of the plurality of rectifiers; a plurality of second lines, each of the plurality of second lines connecting a negative output of the secondary winding of one of the plurality of transformers to a negative input of a respective one of the plurality of rectifiers; a first set of switches, wherein the first set of switches includes a first set switch on each of a respective one of the plurality of second lines; a second set of switches, wherein the second set of switches includes a second set switch on each of a respective one of the plurality of second lines between the negative output of a respective one of the plurality of transformers and a respective first set switch on the respective one of the plurality of second lines; and a set of inductors, wherein a one of the set of inductors is positioned on each of the plurality of second lines between the negative output of a respective one of the plurality of transformers and the respective first set switch. The converter is in an interleaved configuration when all of the first set of switches are closed and all of the second set of switches are open, and the converter is in a delta-wye configuration when all of the first set of switches are open and all of the second set of switches are closed.

A method for switching between an interleaved configuration and a delta-wye configuration in a DC to DC converter is provided that includes setting a threshold switching value; determining whether the converter is operating in the delta-wye configuration or the interleave configuration; determining a switching value; and comparing the switching value to the threshold switching value. When the switching value is below the threshold switching value and the converter is operating in the delta-wye configuration, a first set of switches is opened, wherein each switch of the first set of switches is on a respective line of a plurality of lines, wherein each of the plurality of lines connects one of a plurality of negative outputs of a one of a plurality of secondary windings of one of a plurality of transformers of the converter to one of a plurality a negative inputs of a respective one of a plurality of rectifiers, and a second set of switches is closed, wherein each switch of the second set of switches is on one of the lines of the plurality of lines and is between the switch of the first set of switches and an inductor on the one of the lines of the plurality of lines. When the switching value is above the threshold switching value and the converter is on the interleave configuration, the second set of switches is opened and the first set of switches is closed.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

A hybrid, high-power, bidirectional DC to DC converter has both a delta-wye configuration mode and an interleaved configuration mode and can be dynamically switched between those modes based on selected criteria. A series of switches to allow the converter to switch between the delta-wye configuration and the straight interleaved configuration. In this way, the converter can operate in a delta-wye configuration for low to mid-current input applications and in a straight interleaved configuration for high-current applications. This allows the converter to have high efficiency while maintaining a small size for a wide range of applications.

For power electronics for variable, low-voltage DC generators, such as fuel cells and flow batteries, efficiently handling the relatively high current and boosting the voltage is required. This may be accomplished by dividing the current into channels, converting the DC input to AC, boosting the voltage with a dedicated transformer for each channel, and then rectifying back to DC. In a preferred embodiment, silicon carbide (SiC) power devices are used. By bonding the transformer outputs together in a delta-wye configuration, the boost ratios of the transformers are doubled to create a smaller, more efficient package.

For higher power applications, loop currents in this configuration can become unmanageable during sharp transients, requiring large inductors paired with the transformers to reduce their effects. A straight, interleaved topology would be appropriate for handling these higher power applications. However, it is often the case that applications only operate at very high power for part of the time and the remainder of the time operate at lower power levels at which the benefits of the delta-wye configuration could be realized without the loop current issues.

The present invention is a hybrid converter that actively switches between a delta-wye configuration and a straight interleaved configuration depending on the current size of the load, the presence of induced loop currents, and/or the required boost ratio. The hybrid topology is achieved by the inclusion of sets of switches on the high voltage side that are configured to alter the topology from one configuration to the other.

Figure 1:
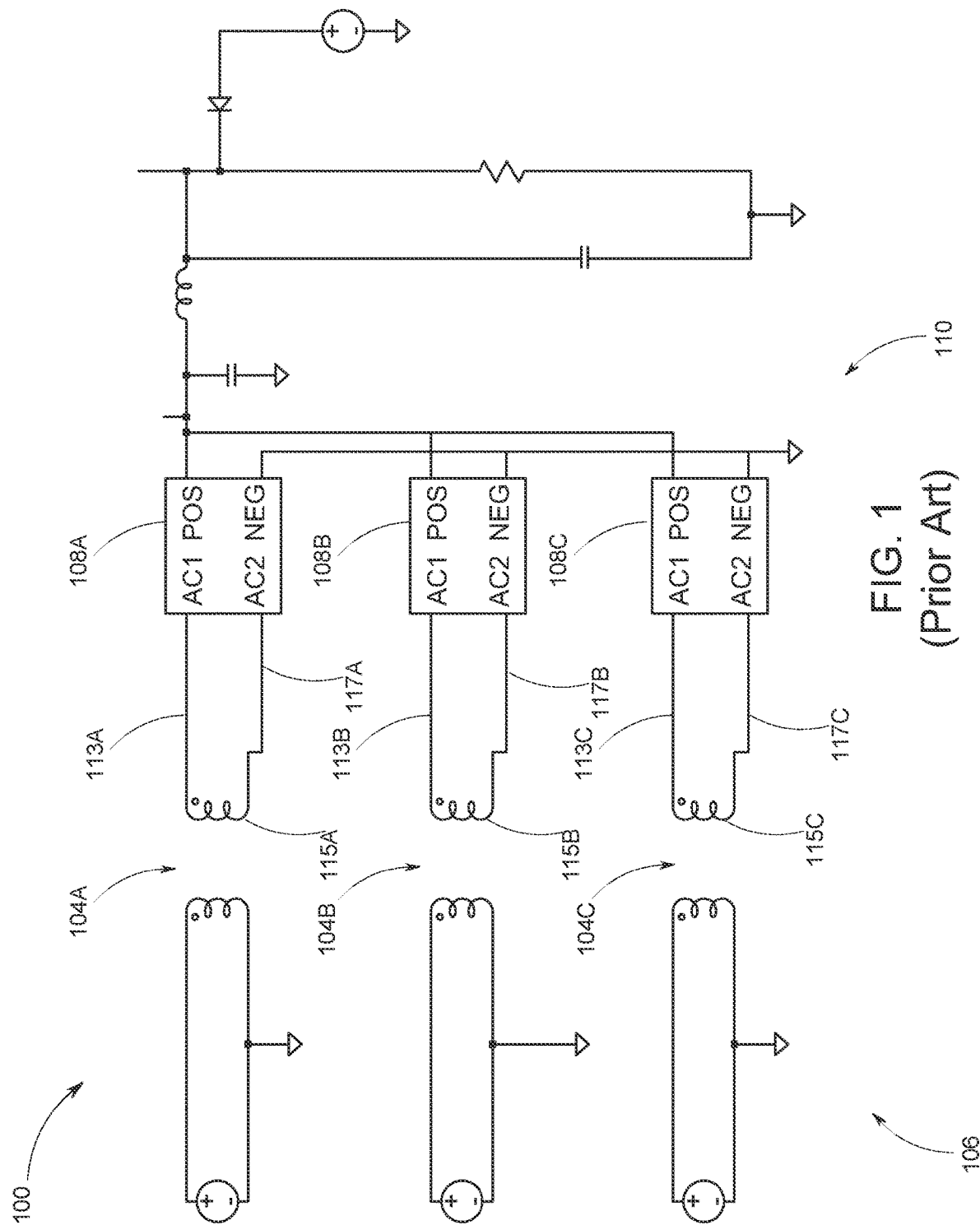
FIG. 1 is a circuit diagram for a prior art converter having a straight interleaved configuration for handling higher voltages without loop current effects.

In FIG. 1 (prior art), a schematic diagram for a converter 100 with an interleaved configuration is shown. This configuration includes a plurality of transformers 104 (e.g., 104A-104C) connected to input voltages on a low voltage side 106 and to respective rectifiers 108 (e.g., 108A-108C) on a high voltage side 110. Each transformer 104 includes a first line 113 (e.g., 113A-113C) connecting the positive side of a secondary winding 115 (e.g., 115A-115C) to the positive input of the respective rectifier 108 and each transformer 104 includes a second line 117 (e.g., 117A-117C) connecting the negative side of secondary winding 115 (e.g., 115A-115C) to the negative input of the respective rectifier 108. Converter 100 forms a full-bridge synchronous rectifier that is shared across each phase for directing energy for situations in which a high boost ratio is not needed, but power is.

For a 10 KW power supply, for example, all three transformers 104 may be utilized at full capacity with a 120-degree phase shift. In this configuration, there is no shared connection between transformers 104 to allow the transformers to be connected in series, which still allows full sharing of power between all the transformers.

Figure 2:
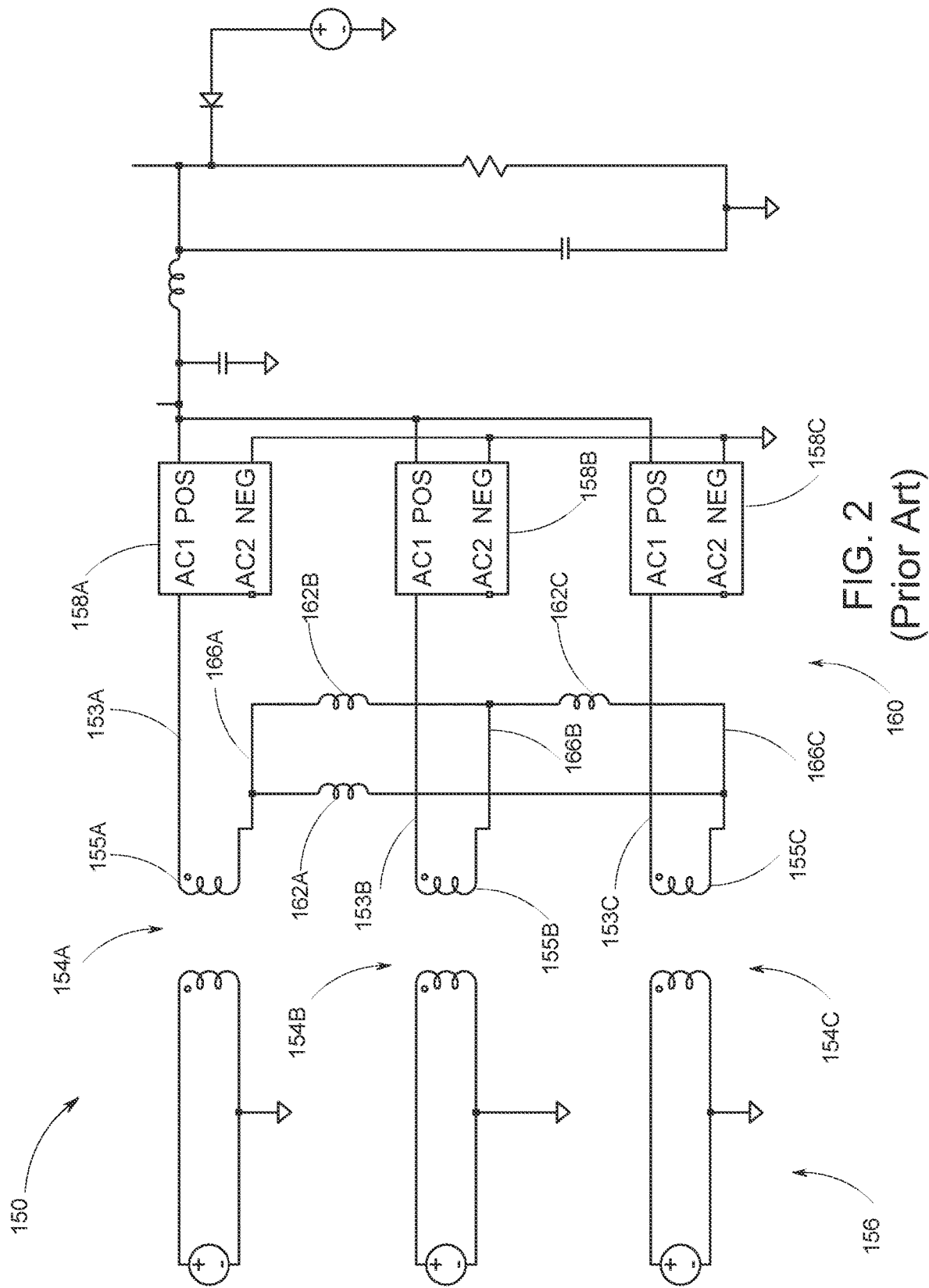
FIG. 2 is a circuit diagram for a prior art converter having a delta-wye transformer configuration for providing a high boost ratio.

A schematic diagram for a converter 150 is shown in FIG. 2 (prior art) with a delta-wye configuration and includes a plurality of transformers 154 (e.g., 154A-154C) connected to input voltages on a low voltage side 156 and to respective rectifiers 158 (e.g., 158A-158C) on a high voltage side 160. Each transformer 154 includes a first line 153 (e.g., 153A-153C) connecting the positive side of a secondary winding 155 (e.g., 155A-155C) to the positive input of the respective rectifier 158. In addition, inductors 162 (e.g., 162A-162C) are positioned on each negative line 166 (e.g., 166A-166C) running from each secondary winding 155 from respective transformers 154. Each negative line 166 then connects to each other. With this topology, the result will be a 2x power boost ratio from low voltage side 156 to high voltage side 160.

Figure 3:
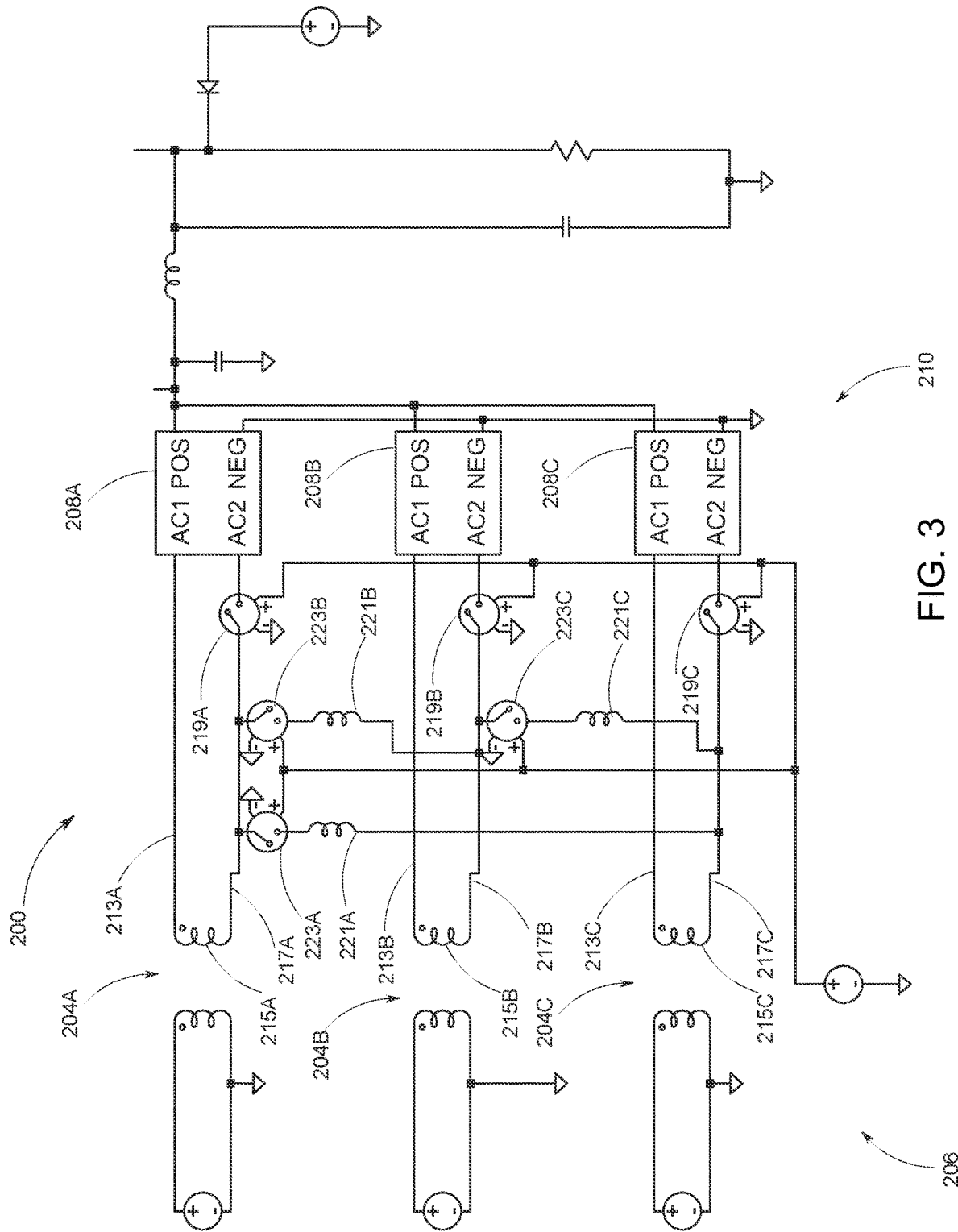
FIG. 3 is a circuit diagram for a hybrid, high-power bidirectional DC to DC converter in accordance with an embodiment of the present invention.

A hybrid, high-power bidirectional DC to DC converter, such as converter 200 a schematic configuration of which is shown in FIG. 3, can be utilized in both a delta-wye configuration and straight interleaved configuration. This hybrid, high-power bidirectional converter 200 allows for active switching between a delta-wye configuration and an interleaved configuration so that the converter can operate in either configuration as appropriate depending on the power being handled at a given time.

Converter 200 includes a plurality of transformers 204 (e.g., 204A-204C) connected to input voltages on a low voltage side 206 and to respective rectifiers 208 (e.g., 208A-208C) on a high voltage side 210. Each transformer 204 includes a first line 213 (e.g., 213A-213C) connecting the positive side of a secondary winding 215 (e.g., 215A-215C) to the positive input of the respective rectifier 208 and each transformer 204 includes a second line 217 (e.g., 217A-217C) running from the negative side of secondary winding 215. Each second line 217 runs to the negative input of respective rectifier 208 with a first switch 219 (e.g., 219A-219C) of a first set of switches positioned between the negative input of respective rectifier 208 and the negative side of secondary winding 215. In addition, on each second line 217 is an inductor 221 (e.g., 221A-221C) positioned between first switch 219 and secondary winding 215. Further, each second line 217 includes a second switch 223 (e.g., 223A-223C) of a second set of switches associated with each respective inductor 221.

With this configuration, converter 200 can function in either a straight interleaved mode or a delta-wye mode. When the set of first switches 219 are closed and the set of second switches 223 are open, converter 200 will operate as a straight interleaved converter. When the set of first switches 219 are open and the set of second switches 223 are closed, converter 200 will operate as a delta-wye converter. In this way, two transformer winding ratios can be selected, thereby allowing double the potential operational output range compared to a converter with a single topology.

Converter 200 may be switched from one mode of operation to the other dynamically based on selected thresholds. These thresholds may include the required boost ratio, the current size of the load, or the presence of induced loop currents.

For example, if switching is to be based on the required boost ratio (which is based on the present input voltage and the desired output voltage), a boost ratio switching threshold is set and the required boost ratio is determined (e.g., by detecting the present input voltage). If the boost of input voltage needs to be higher than or equal to the selected threshold, which may be a single transformer's winding ratio, then the delta-wye mode is selected and the set of first switches 219 are opened and the set of second switches 223 are closed. When the required boost ratio is below the selected threshold (in this example, a single transformer's winding ratio), the set of first switches 219 are closed and the set of second switches 223 are opened to place converter 200 in interleaved mode. (It will be understood that the switches will remain in their current states if switching configurations is not required.) The pertinent parameters are monitored at an appropriate frequency to allow for timely switching.

In a preferred embodiment, in transitioning between modes, hysteresis is used to avoid switching too frequently or too quickly, such as may be the case when the determined parameters are close to and/or fluctuating around the threshold. For example, if the converter is in delta-wye mode, as the ratio of output to input voltage decreases, delta-wye mode may be maintained below the threshold transformer winding ratio by a selected delta amount and/or a predetermined amount of time before switching to interleaved mode. Similarly, if the converter is in interleaved mode, as the ratio of input to output voltage is approaching the threshold transformer winding ratio, switching may occur at a selected setpoint below this threshold so that performance of the converter is not adversely affected during the transition.

In addition, when operating in interleaved mode with light loads (as set based on expected operational conditions), dynamic switching on and off individual phases may occur to increase overall efficiency. However, for light loads experienced when operating in delta-wye mode, all phases are run in order to maintain the appropriate boost voltage and performance.

Figure 4:
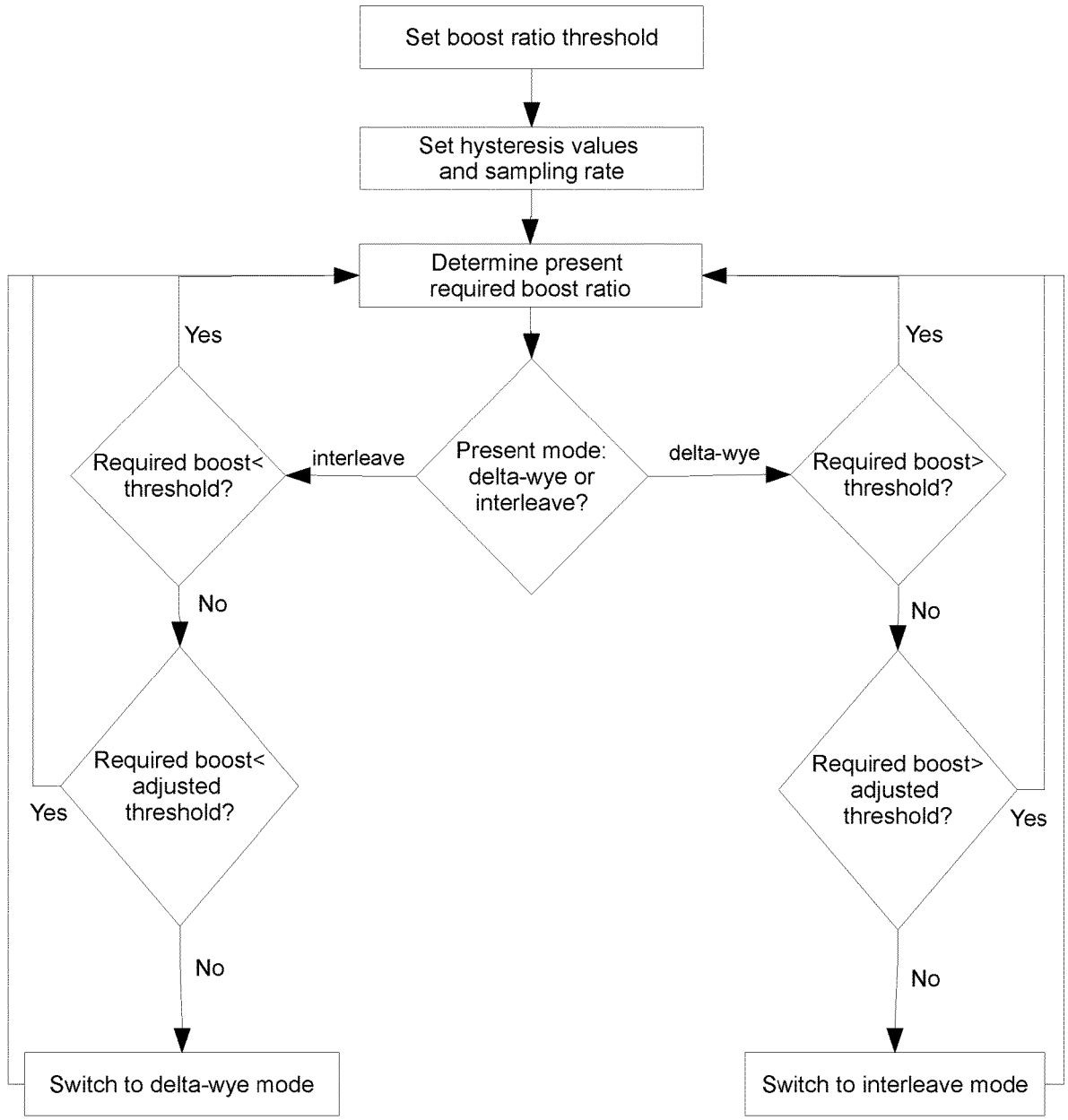
FIG. 4 is a process diagram of a method for switching in a hybrid, high-power bidirectional DC to DC converter in accordance with an embodiment of the present invention.

A process for switching between configurations in a hybrid, high-power bidirectional DC to DC converter is outlined in FIG. 4. A threshold boost ratio is set, which may be the transformer winding ratio. In addition, a delta-wye-to-interleave hysteresis value may be selected, as well as a sampling frequency and an interleave-to-delta-wye hysteresis value. The present mode of operation is determined (i.e., delta-wye mode or interleaved mode). A required boost ratio is determined based on detection of present input voltage and system parameters, which may include the transformer winding ratio, and compared to the threshold value. The threshold value may be adjusted by the delta-wye-to-interleave hysteresis value if the converter is in delta-wye mode or the interleave-to-delta-wye hysteresis value if the converter is in interleave mode.

If the converter is in delta-wye mode and the determined required boost ratio is above the threshold (or adjusted threshold), the mode is not switched and the required boost ratio is determined again at the next appropriate time based on the sampling frequency. If the converter is in delta-wye mode and the determined required boost ratio is below the threshold (or adjusted threshold), the mode is switched to interleave mode by closing the first set of switches and opening the second set of switches (as described above). If the converter is in interleave mode and the determined required boost ratio is below the threshold (or adjusted threshold), the mode is not switched and the required boost ratio is determined again at the next appropriate time based on the sampling frequency. If the converter is in interleave mode and the determined required boost ratio is above the threshold (or adjusted threshold), the mode is switched to delta-wye mode by opening the first set of switches and closing the second set of switches (as described above).

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A hybrid, high-power bidirectional DC to DC converter comprising:
    a plurality of transformers, each of the plurality of transformers having a secondary winding;
    a plurality of rectifiers, wherein each of the plurality of rectifiers is associated with a respective one of the plurality of transformers;
    a plurality of first lines, each of the plurality of first lines connecting a positive output of the secondary winding of one of the plurality of transformers to a positive input of a respective one of the plurality of rectifiers;
    a plurality of second lines, each of the plurality of second lines connecting a negative output of the secondary winding of one of the plurality of transformers to a negative input of a respective one of the plurality of rectifiers;
    a first set of switches, wherein the first set of switches includes a first set switch on each of a respective one of the plurality of second lines;
    a second set of switches, wherein the second set of switches includes a second set switch on each of a respective one of the plurality of second lines between the negative output of a respective one of the plurality of transformers and a respective first set switch on the respective one of the plurality of second lines; and
    a set of inductors, wherein a one of the set of inductors is positioned on each of the plurality of second lines between the negative output of a respective one of the plurality of transformers and the respective first set switch,
    wherein the converter is in an interleaved configuration when all of the first set of switches are closed and all of the second set of switches are open, and wherein the converter is in a delta-wye configuration when all of the first set of switches are open and all of the second set of switches are closed.

2. The converter of claim 1, wherein the converter is in the interleaved configuration when a required boost ratio is less than a boost ratio threshold and wherein the converter is in the delta-wye configuration when the required boost ratio is less than the boost ratio threshold.

3. A method for switching between an interleaved configuration and a delta-wye configuration in a DC to DC converter comprising:
    setting a threshold switching value;
    determining whether the converter is operating in the delta-wye configuration or the interleave configuration;
    determining a switching value;
    comparing the switching value to the threshold switching value; and
    when the switching value is below the threshold switching value and the converter is operating in the delta-wye configuration:
        opening a first set of switches, wherein each switch of the first set of switches is on a respective line of a plurality of lines, wherein each of the plurality of lines connects one of a plurality of negative outputs of a one of a plurality of secondary windings of one of a plurality of transformers of the converter to one of a plurality a negative inputs of a respective one of a plurality of rectifiers; and
        closing a second set of switches, wherein each switch of the second set of switches is on one of the lines of the plurality of lines and is between the switch of the first set of switches and an inductor on the one of the lines of the plurality of lines; and when the switching value is above the threshold switching value and the converter is on the interleave configuration:
opening the second set of switches; and
closing the first set of switches.

4. The method of claim 3, further including, when the converter is in the delta-wye configuration, adjusting the threshold switching value by subtracting a selected amount.

5. The method of claim 3, further including, when the converter is in the interleave configuration, adjusting the threshold switching value by subtracting a second selected amount.

6. The method of claim 3, wherein the threshold switching value is a transformer winding ratio of the converter.

7. The method of claim 3, further including determining the switching value at 0.5 second intervals.

8. The method of claim 3, further including maintaining, when the switching value is above the threshold switching value and the converter is operating in the delta-wye configuration, the first set of switches in a closed state and the second set of switches in an open state.

9. The method of claim 3, further including maintaining, when the switching value is below the threshold switching value and the converter is operating in the interleave configuration, the first set of switches in an open state and the second set of switches in a closed state.

* * * * *